Aug. 28, 1934.  H. A. GOLLMAR  1,971,779
GAS PURIFICATION PROCESS AND RECOVERY OF BY-PRODUCTS THEREFROM
Filed Jan. 8, 1932
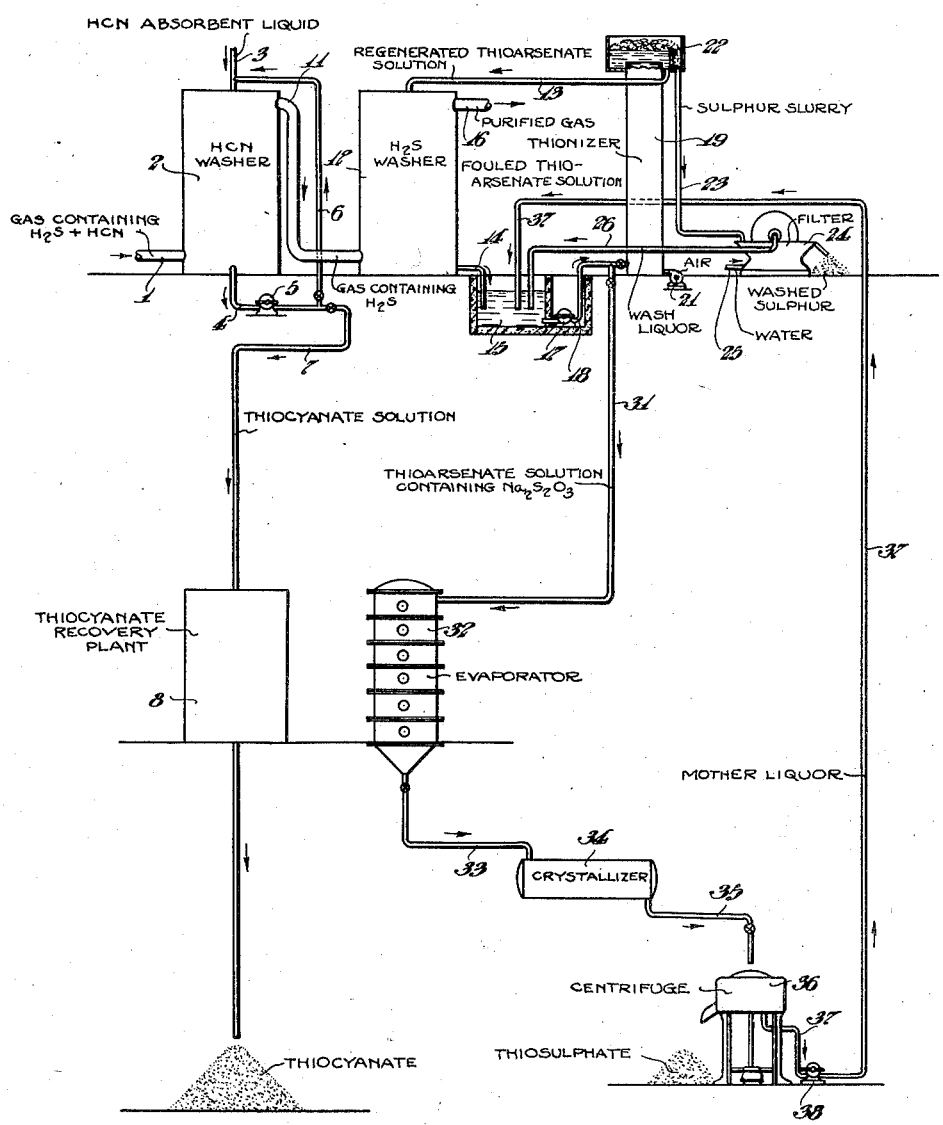
INVENTOR.
Herbert A. Gollmar.
BY
Jesse R. Langley
ATTORNEY.

Patented Aug. 28, 1934

1,971,779

UNITED STATES PATENT OFFICE 1,971,779

GAS PURIFICATION PROCESS AND RECOVERY OF BY-PRODUCTS THEREFROM

Herbert A. Gollmar, West Caldwell, N. J., assignor to The Koppers Company of Delaware, a corporation of Delaware Application January 8, 1932, Serial No. 585,446

1 Claim. (Cl. 23—3)

My invention relates to the treatment of gases containing hydrogen sulphide and hydrogen cyanide and more particularly to the purification of gaseous mixtures from these substances when the latter are present as impurities.

In my prior U. S. Patent No. 1,719,762, there is described a process for the purification of gases in hydrogen sulphide and analogous acidic constituents. In a preferred form of this process, the gas to be purified is treated with a solution containing a sodium thio-arsenate compound. The solution is then removed from the gas and aerated to cause the oxidation of absorbed hydrogen sulphide to free sulphur and the regeneration of the solution which is then returned for further purification of gas.

While the removal of hydrogen sulphide from the gas according to the above process is accompanied by certain side reactions resulting in the formation of inert materials such as sodium thiosulphate, by far the bulk of the hydrogen sulphide is removed by reaction with the sodium thioarsenate compound, which is regenerated in the actification or aeration stage. As a matter of fact, the formation of sodium thiosulphate in the thio-arsenic process is extremely low. Consequently, so far as absorption of hydrogen sulphide is concerned, the consumption of sodium (generally supplied in the form of sodium carbonate) is likewise extremely low.

The removal of hydrogen cyanide in the thio-arsenic process is, however, substantially entirely effected through the formation of inert products such as sodium thiocyanate, not capable of regeneration and repeated use, and this results in a direct consumption of sodium.

Moreover, the soda consumption of the thio-arsenic process, when employed for the purification of gases containing both hydrogen sulphide and hydrogen cyanide, appears to be greater than would normally be expected from observations based on the purification of gas containing no hydrogen cyanide, even when the conversion of hydrogen cyanide to sodium thiocyanate is taken into account. The actual purification efficiency of the thio-arsenic process appears to be materially reduced in some not as yet fully understood way by the presence of hydrogen cyanide.

Whether this is due to some selective action of hydrogen cyanide as compared with the action of hydrogen sulphide or to some negative catalytic effect upon hydrogen sulphide absorption exerted by hydrogen cyanide, or to some other cause, I am unable to say, but, whatever the cause, the presence of hydrogen cyanide has been found to exert a harmful and unpredictable effect upon the process, so far as the primary purpose of the process, i. e., removal of hydrogen sulphide, is concerned. As some widely used fuel gases, for example, coke-oven gas, contain both hydrogen sulphide and hydrogen cyanide, the problem is of considerable importance.

One of the objects of my invention is to remove hydrogen cyanide and hydrogen sulphide from gases containing both of these constituents in an efficient manner without permitting the absorption of one to have a harmful effect upon the absorption of the other.

A second object of my invention is to provide a process of purifying gas containing hydrogen sulphide and hydrogen cyanide from these impurities by means of an arsenical solution, in which the necessity of disposing of arsenical effluent is avoided.

A still further object of my invention is to provide a process of purifying gases containing hydrogen sulphide and hydrogen cyanide, in which inert reaction products of these impurities are separately produced, thereby avoiding tedious and difficult steps which would otherwise be necessary to accomplish their separation.

My invention has, for further objects, such other operative advantages and improvements as may hereinafter be found to obtain.

My invention contemplates the initial treatment of gas containing hydrogen sulphide and hydrogen cyanide for the removal of hydrogen cyanide in a known manner and the subsequent removal of the hydrogen sulphide by means of the thio-arsenic process described in my Patent No. 1,719,762, and I have found that this initial removal of hydrogen cyanide is of marked advantage insofar as the subsequent removal of hydrogen sulphide is concerned.

In prior processes in which the hydrogen sulphide and hydrogen cyanide have been removed simultaneously and, more particularly, the thio-arsenic process, where preliminary removal of HCN was practiced, the sodium thiosulphate and sodium thiocyanate which have been produced during the continued operation of the process have necessarily been present in the same solution and these substances are sufficiently similar to make their separation a matter of considerable difficulty.

In my process, this is avoided by the fact that all of the sodium thiocyanate produced is confined to the liquid used in the initial or preliminary stage, while the sodium thiosulphate is formed in the liquid used in the subsequent stage.

This inherent separation of the sodium thiocyanate and sodium thiosulphate has an additional advantage. During the continued performance of the thioarsenic process, the gradual accumulation of sodium thiosulphate in the solution makes it necessary from time to time either to discard portions of the solution or to treat the solution in some way for the recovery of thiosulphate.

In a few instances it has been attempted to avoid this by simply allowing the liquid entrained in the removal of sulphur to balance the accumulation of thiosulphate. However, this is not ordinarily desirable for several reasons. In the first place, it does not provide for the recovery of sulphur sufficiently pure for most uses. In the second place, it represents a loss of valuable thiosulphate, and, in the third place, it represents a loss of extremely valuable arsenic compound, which, in any event, it would be impossible to discard in the form of an effluent by reason of the toxic quality of arsenic compounds.

When thiocyanate is not present in the recirculating liquor employed for the removal of the hydrogen sulphide, it is possible as set forth in the copending application of George M. Carvlin, Serial No. 515,415, filed February 12, 1931, Patent 1,932,812, to take care of the accumulation of inert products of side reaction in a very simple manner by simply concentrating portions of the solution by evaporation from time to time and cooling the concentrated liquor to cause the separation of a portion of the large amount of thiosulphate present. After removal of the precipitated thiosulphate, the mother liquor which contains arsenic may then be returned to the recirculating liquid without loss.

Especially where the sulphur produced is washed to purify the same and the washed liquor is returned to the process, this simple method of recovering thiosulphate is of special advantage. However, were thiocyanate present, it would not be advantageous, due to the fact that this procedure is substantially ineffective to remove thiocyanate nor is there any other simple method of recovering the thiocyanate without loss of the valuable material from the system or contamination of the recovered thiocyanate.

According to the preferred form of my process, the sulphur recovered in the actification stage of the thio-arsenic process is washed, the wash liquor containing arsenic and thiosulphate being returned to the recirculating solution. Portions of the recirculating solution are withdrawn from time to time, concentrated and cooled according to the method of Carvlin to effect the separation of thiosulphate, and the mother liquor is returned to the solution. Consequently, no arsenical effluent is obtained. The sulphur, sodium, thiocyanate and sulphur sodium thiosulphate are separately recovered in exceptionally pure form and without loss of valuable constituents.

In order that my invention may be fully set forth and understood, I now describe with reference to the accompanying drawing the preferred manner in which it is carried out and practiced. In this drawing, The single figure is a more or less diagrammatic illustration of my process.

Referring to the drawing, the gas to be purified and containing hydrogen sulphide and hydrogen cyanide is introduced through an inlet 1 to a hydrogen cyanide washer 2 of suitable type, where it is treated with a liquid having selectively absorbent properties with respect to hydrogen cyanide, for example, an aqueous and preferably alkaline suspension of sulphur or an alkaline suspension of a ferrous precipitate or any other suitable absorbent liquid.

The absorbent liquid is introduced to the washer 2 through an inlet 3 and the resultant solution containing thiocyanate or absorbed HCN in any other form is removed from the washer through a conduit 4. The bulk of the solution may be recirculated by means of a pump 5 and a conduit 6 over the washer 2 and, during the course of this recirculation, may be aerated or otherwise treated for the removal of HCN, if desired, and if the character of the solution permits.

Ordinarily, however, hydrogen cyanide would simply be allowed to accumulate in the liquid as thiocyanate and portions or all of the liquid containing the thiocyanate are then delivered through a conduit 7 to a thiocyanate recovery plant 8 of any suitable type.

As the recovery of thiocyanate from the liquid of this character containing substantially no thiosulphate presents no difficulties and is well known in the art, further description of the thiocyanate recovery plant is unnecessary. So far as the present process is concerned, it is merely necessary to accomplish the removal of substantially all hydrogen cyanide in the washer 2, preferably without removing hydrogen sulphide.

The gas thus freed from hydrogen cyanide in the washer 2 then passes through conduit 11 to a second washer 12, where it is treated by means of a thio-arsenate solution, such as a solution containing sodium thio-arsenate prepared by dissolving a mixture of $Na_2CO_3$ and $As_2O_3$. The solution is introduced to the washer 12 through a conduit 13, and, upon coming into contact with the gas containing hydrogen sulphide, absorbs the latter impurity. The thereby fouled thio-arsenate solution passes out of the washer 12 through a conduit 14 to a tank or sump 15 while the purified gas passes out of the washer through an outlet 16.

From the sump 15, the fouled solution is withdrawn by a pump 17 and delivered through a conduit 18 to a so-called thionizer 19 or other suitable aeration apparatus, such as that shown in U. S. Patent No. 1,774,366 to Gluud and Schönfelder. This thionizer consists of a relatively tall vessel, to the bottom of which the fouled solution is supplied through the conduit 18 and air or other oxygen-containing gas is supplied from a fan or blower 21.

The fouled solution and air pass upward through the thionizer 19, and during this passage the oxygen in the air effects the regeneration of the solution, the absorbed hydrogen sulphide being partially oxidized to free sulphur which rises to the top of the thionizer 19, upon which is mounted a suitable sulphur separator 22. Some thiosulphate is also formed during oxidation.

The thereby regenerated thio-arsenate solution then returns to the top of the washer 12 through the conduit 13 while the sulphur slurry from the separator 22 passes through a conduit 23 to a filter 24. Here the sulphur is separated and washed by means of water introduced through a conduit 25 and the filtrate and wash liquor returns, through a conduit 26, to the sump 15, where it joins the main body of recirculation solution.

As thiosulphate accumulates in the solution, portions are withdrawn from time to time through a conduit 31, which may, as shown, communicate with the conduit 18, and these portions are delivered to an evaporator 32 of any suitable type. In the evaporator 32, the liquid is reduced in volume by the loss of water and the hot solution is then transferred through a conduit 33 to a crystallizing tank 34, where it is allowed to cool. Suitable agitating apparatus may be provided in the crystallizing tank 34, if so desired.

Before evaporating the solution, a small amount of alkali or material of alkaline reaction, such as sodium carbonate, may be added, to render the solution alkaline and prevent corrosion of the evaporator 32.

Upon cooling of the liquid in the crystallizing tank 34, a considerable portion of the thiosulphate crystallizes out and the liquid containing the crystallized thiosulphate is then delivered through a conduit 35 to a centrifuge 36, where the thiosulphate crystals are removed. The mother liquor containing arsenic and containing some thiosulphate in solution is then returned through a conduit 37, in which is located a pump 38 to the sump 15, where it rejoins the main body of recirculating solution.

The withdrawal of solution of the recirculating system through the conduit 31 is so regulated that the subsequent removal of thiosulphate therefrom will balance the normal rate of formation of thiosulphate in the recirculating liquid.

The evaporation taking place in the evaporator 32 is ordinarily regulated to such extent as to balance the accumulation of water in the system, whether through the influx of water delivered to the filter 24 for washing the sulphur or water condensed from the gas in the washer 12, should any condensation take place. In this manner, it is possible to operate without producing any arsenical effluent and without losing valuable arsenic compound from the purifying system.

The solution employed in the washer 12 preferably comprises a solution of sodium thioarsenate although other solutions may be employed, as set forth in my prior Patent No. 1,719,762. Preferably, however, I employ a solution initially containing from 0.5% to 1.0% of $As_2O_3$.

It will be obvious to those skilled in the art that my invention is capable of modification without departing from the spirit thereof and it is, therefore, not to be limited to any specific examples given hereinabove merely by way of illustration but is to be construed as of the scope of the claim hereinafter made.

I claim as my invention:—

In a process of purifying gas containing hydrogen sulphide and hydrogen cyanide of the hydrogen sulphide with an arsenical solution the improvement which comprises, preliminarily treating the gas with an absorbent having selectively absorbent properties with respect to HCN, and thereafter treating the substantially HCN-free gas with an arsenical solution to remove $H_2S$, removing the solution and aerating the same, whereby the absorbed $H_2S$ is oxidized to free sulphur and thiosulphate, and returning the thereby regenerated solution for further absorption of $H_2S$.

HERBERT A. GOLLMAR.